United States Patent
Bae et al.

(10) Patent No.: US 10,403,922 B2
(45) Date of Patent: Sep. 3, 2019

(54) BATTERY WITH EMBEDDED FIBER OPTIC CABLE

(71) Applicant: Palo Alto Research Center Incorporated, Palo Alto, CA (US)

(72) Inventors: Chang-Jun Bae, Mountain View, CA (US); Eric J. Shrader, Belmont, CA (US); Ajay Raghavan, Mountain View, CA (US); Peter Kiesel, Palo Alto, CA (US); Saroj Sahu, Fremont, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 472 days.

(21) Appl. No.: 14/338,916

(22) Filed: Jul. 23, 2014

(65) Prior Publication Data
US 2016/0028102 A1    Jan. 28, 2016

(51) Int. Cl.
| | |
|---|---|
| *H01M 10/04* | (2006.01) |
| *H01G 11/24* | (2013.01) |
| *H01G 11/52* | (2013.01) |
| *H01M 10/48* | (2006.01) |
| *H01G 11/28* | (2013.01) |
| *H01M 4/04* | (2006.01) |
| *H01G 11/06* | (2013.01) |
| *H01G 11/50* | (2013.01) |

(52) U.S. Cl.
CPC ......... *H01M 10/04* (2013.01); *H01M 4/0404* (2013.01); *H01M 10/48* (2013.01); *H01G 11/06* (2013.01); *H01G 11/28* (2013.01); *H01G 11/50* (2013.01); *Y02T 10/7022* (2013.01)

(58) Field of Classification Search
CPC ........ H01G 11/06; H01G 11/28; H01G 11/50; H01M 10/04; H01M 10/48; H01M 4/0404; Y02T 10/7022
See application file for complete search history.

(56) References Cited

U.S. PATENT DOCUMENTS

| | | | |
|---|---|---|---|
| 4,240,747 | A | 12/1980 | Harmer |
| 5,066,752 | A | 11/1991 | Favstitsky et al. |
| 5,660,944 | A | 8/1997 | Sprengel et al. |
| 5,949,219 | A | 9/1999 | Weiss |
| 5,995,686 | A | 11/1999 | Hamburger et al. |
| 6,051,437 | A | 4/2000 | Luo et al. |

(Continued)

FOREIGN PATENT DOCUMENTS

| | | |
|---|---|---|
| EP | 1324516 | 12/2005 |
| EP | 2492989 | 10/2013 |

(Continued)

OTHER PUBLICATIONS

File History for EP App. No. 15176679.7 as retrieved from the EP Electronic File System on Aug. 5, 2016, 88 pages.

(Continued)

*Primary Examiner* — Lingwen R Zeng
(74) *Attorney, Agent, or Firm* — Hollingsworth Davis, LLC (57) ABSTRACT

A method of fabricating an electrochemical energy storage cell such as a battery or supercapacitor involves positioning a portion of a fiber optic cable that includes at least one optical fiber sensor over a current collector layer. The electrode material of the energy storage cell is deposited over the current collector layer and the fiber optic cable.

27 Claims, 7 Drawing Sheets

(56) References Cited

U.S. PATENT DOCUMENTS

| | | | |
|---|---|---|---|
| 6,265,100 | B1 | 7/2001 | Saaski et al. |
| 6,285,807 | B1 | 9/2001 | Walt et al. |
| 6,379,969 | B1 | 4/2002 | Mauze et al. |
| 6,828,055 | B2 | 12/2004 | Kearl |
| 7,135,342 | B2 | 11/2006 | Colvin, Jr. et al. |
| 7,155,075 | B2 | 12/2006 | Rajendran et al. |
| 7,263,246 | B1 | 8/2007 | Duan et al. |
| 7,306,951 | B1 | 12/2007 | Benson et al. |
| 7,310,153 | B2 | 12/2007 | Kiesel et al. |
| 7,315,667 | B2 | 1/2008 | Schmidt et al. |
| 7,433,552 | B2 | 10/2008 | Kiesel et al. |
| 7,511,823 | B2 | 3/2009 | Schultz et al. |
| 7,522,786 | B2 | 4/2009 | Kiesel et al. |
| 7,589,312 | B2 | 9/2009 | Kojima |
| 7,695,970 | B2 | 4/2010 | Parnas et al. |
| 7,701,590 | B2 | 4/2010 | Kiesel et al. |
| 7,718,948 | B2 | 5/2010 | Kiesel |
| 7,766,544 | B2 | 8/2010 | Shibuya et al. |
| 8,097,352 | B2 | 1/2012 | Fuse |
| 8,143,070 | B2 | 3/2012 | Tokhtuev et al. |
| 8,148,165 | B2 | 4/2012 | Nakano |
| 8,241,911 | B2 | 8/2012 | Ascheman et al. |
| 8,268,493 | B2 | 9/2012 | Cetegen et al. |
| 8,434,940 | B2 | 5/2013 | Lachenmeier et al. |
| 8,437,582 | B2 | 5/2013 | Kiesel et al. |
| 8,594,470 | B2 | 11/2013 | Kiesel et al. |
| 8,709,645 | B2 | 4/2014 | Roy |
| 8,729,862 | B2 | 5/2014 | Yebka et al. |
| 8,808,890 | B2 | 8/2014 | Fuse |
| 9,000,718 | B2 | 4/2015 | Park |
| 9,203,122 | B2 | 12/2015 | Raghavan et al. |
| 9,553,465 | B2 | 1/2017 | Raghavan et al. |
| 9,677,916 | B2 | 6/2017 | Hegyi et al. |
| 2004/0033004 | A1 | 2/2004 | Welch et al. |
| 2004/0197646 | A1* | 10/2004 | Hatta ............... H01M 2/021 429/184 |
| 2005/0026134 | A1 | 2/2005 | Miller et al. |
| 2006/0045412 | A1 | 3/2006 | Xiao et al. |
| 2006/0147792 | A1 | 7/2006 | Nelson et al. |
| 2006/0222305 | A1* | 10/2006 | Crownover ............. G02B 6/14 385/123 |
| 2008/0231836 | A1 | 9/2008 | Curello et al. |
| 2009/0027009 | A1 | 1/2009 | Sievertsen |
| 2009/0091759 | A1 | 4/2009 | Pan et al. |
| 2009/0158911 | A1* | 6/2009 | Goll ............... B26D 3/003 83/880 |
| 2009/0220189 | A1 | 9/2009 | Kiesel et al. |
| 2009/0274849 | A1 | 11/2009 | Scott et al. |
| 2010/0032009 | A1 | 2/2010 | Skryabin |
| 2010/0119950 | A1* | 5/2010 | Hwang ........... H01M 10/0565 429/303 |
| 2010/0124250 | A1* | 5/2010 | Lachenmeier ...... H01M 2/1613 374/152 |
| 2010/0247027 | A1 | 9/2010 | Xia et al. |
| 2012/0232354 | A1 | 9/2012 | Ecker et al. |
| 2012/0321242 | A1 | 12/2012 | Schade et al. |
| 2013/0071739 | A1 | 3/2013 | Tajima et al. |
| 2013/0312947 | A1 | 11/2013 | Bandhauer et al. |
| 2013/0314094 | A1 | 11/2013 | Farmer et al. |
| 2013/0316198 | A1 | 11/2013 | Bandhauer et al. |
| 2014/0072836 | A1 | 3/2014 | Mills |
| 2014/0092375 | A1 | 4/2014 | Raghavan et al. |
| 2014/0109397 | A1 | 6/2014 | Devan et al. |
| 2014/0203783 | A1* | 7/2014 | Kiesel ............... H01M 10/42 320/134 |
| 2014/0272493 | A1 | 9/2014 | Evans et al. |
| 2014/0312828 | A1 | 10/2014 | Vo et al. |
| 2014/0363747 | A1 | 12/2014 | Evans et al. |
| 2014/0370338 | A1 | 12/2014 | Lim |
| 2015/0214757 | A1 | 7/2015 | Zane et al. |
| 2015/0255824 | A1 | 9/2015 | Evans et al. |
| 2016/0028129 | A1 | 1/2016 | Raghavan et al. |

FOREIGN PATENT DOCUMENTS

| | | |
|---|---|---|
| EP | 2937928 | 10/2015 |
| JP | 63301470 | 12/1988 |
| JP | 2009059582 | 3/2009 |
| WO | WO2013111698 | 8/2013 |
| WO | WO2014026093 | 2/2014 |

OTHER PUBLICATIONS

Reinfelder et al., Thermal In-Cell Measurement for Li-Ion Pouch Cells:, http://mediatum.ub.tum.de/doc/1161062/1161062.pdf:, Mar. 26, 2012, 23 pages.

Cao-Paz et al., "A Multi-Point Sensor Based on Optical Fiber for the Measurement of Electrolyte Density in Lead-Acid Batteries", Sensors 2010, 10, pp. 2587-2608.

Chehura et al. "Temperature and strain discrimination using a single tilted fibre Bragg grating", Opt. Commun., vol. 275, No. 2, Jul. 2007, pp. 344-347.

Corbellini et al., "Modified POF Sensor for Gaseous Hydrogen Fluoride Monitoring in the Presence of Ionizing Radiations", IEEE Transactions on Instrumentation and Measurement, vol. 61, No. 5, May 2012, pp. 1201-1208.

Grobnic et al., "Sapphire Fiber Bragg Grating Sensor Made Using Femtosecond Laser Radiation for Ultrahigh Temperature Applications", IEEE Photonics Technology Letters, vol. 16, No. 11, Nov. 2004, p. 2505-2507.

Guan et al. "Simultaneous strain and temperature measurement using a single fibre Bragg grating", Electron. Lett.,vol. 36, No. 12, 2000, pp. 1018-1019.

Haase, "Strain Sensors Based on Bragg Gratings", IMEKO 20th TC3, 3rd TC16 and 1st TC22 International Conference Cultivating Metrological Knowledge, Nov. 27, 2007, 8 pages.

Jansen et al., "Low-Cost Flexible Packaging for High-Power Li-Ion HEV Batteries", FreedomCar & Vehicle Technologies Office, Jun. 2004, 56 pages.

Jin et al. "Geometric representation of errors in measurements of strain and temperature", Opt. Eng., vol. 36, No. 8, 1997, pp. 2272-2278.

Juergens et al., "Performance Evaluation of Fiber Bragg Gratings at Elevated Temperatures", NASA, Jan. 2004, 14 pages.

Kersey et al., "Fiber Grating Sensors", Journal of Lightwave Technology, vol. 15, No. 8, Aug. 1997, pp. 1442-1463.

Klein et al., "Optimal Charging Strategies in Lithium-Ion Battery", 2011 American Control Conference, Jun. 29-Jul. 1, 2011, pp. 382-387.

Koch et al., "Arrayed waveguide grating interrogator for fiber Bragg grating sensors: measurement and simulation", Applied Optics, vol. 51, No. 31, Nov. 1, 2012, pp. 7718-7723.

Kumai et al., "Gas Generation Mechanism Due to Electrolyte Decomposition in Commercial Lithium-Ion Cell", Journal of Power Sources 81-82, 1999, pp. 715-719.

Lee et al., "In Situ Monitoring of Temperature Inside Lithium-Ion Batteries by Flexible Micro Temperature Sensors", Sensors 2011, 11, pp. 9942-9950.

Li et al., "Preliminary Investigation of an SOI-based Arrayed Waveguide Grating Demodulation Integration Microsystem" Scientific Reports, May 6, 2014, 6 pages.

Liang et al., "Highly Sensitive Fiber Bragg Grating Refractive Index Sensors", Applied Physics Letters, vol. 86, 2005, pp. 151122-1-151122-3.

Merzbacher et al., "Fiber Optic Sensors in Concrete Structures: A Review", Smart Mater. Struct., 5, 1996, pp. 196-280.

Micron Optics, "Optical Fiber Sensors Guide", 21 pages.

Niewczas et al. "Performance Analysis of the Fiber Bragg Grating Interrogation System Based on an Arrayed Waveguide Grating", IEEE Transactions on Instrumentation and Measurement, vol. 53, No. 4, Aug. 2004, pp. 1192-1195.

Patrick et al. "Hybrid fiber Bragg grating/long period fiber grating sensor for strain/temperature discrimination", IEEE Photonics Technol. Lett., vol. 8, No. 9, 1996, pp. 1223-1225.

(56) References Cited

OTHER PUBLICATIONS

Pinson et al., "Theory of SEI Formation in Rechargeable Batteries: Capacity Fade, Accelerated Aging and Lifetime Prediction", 223$^{rd}$ ECS Meeting, May 12-17, 2013, 29 pages.

Qi et al., "In Situ Observation of Strains During Lithiation of a Graphite Electrode", Journal of the Electrochemical Society, vol. 157 (6), 2010, pp. A741-A747.

Qin et al., "Specific Fluorescence Determination of Lithium Ion Based on 2-(2-hydroxyphenyl)benzoxazole", The Royal Society of Chemistry, 2001, pp. 1499-1501.

Rao: "In-fibre Bragg grating sensors", Meas. Sci. Technol., vol. 8, No. 4, Apr. 1997, pp. 355-375.

Reimers et al. "Electrochemical and In Situ X-Ray Diffraction Studies of Lithium Intercalation in Li x Co02", Journal of the Electrochemical Society, 139 (8),1992.

Rodrigues et al., "A Review of State-of-Charge Indication of Batteries by Means of A.C. Impedance Measurements", Journal of Power Sources, vol. 87, 2000, pp. 12-20.

Roth et al., "Thermal Abuse Performance of 18650 Li-Ion Cells", Sandia Report, Mar. 2004, pp. 1-139.

Saha et al. "Battery Data Set", NASA Ames Prognostics Data Repository, 2007, Available online: http://tLarc.nasa.gov/tech/dash/pcoe/prognostic-data-repository/.

Sang et al., "Temperature-Insensitive Chemical Sensor Based on a Fiber Bragg Grating", Sensors and Actuators B 120, 2007, pp. 754-757.

Sethuraman et al. "Surface structural disordering in graphite upon lithium intercalation/deintercalation", Journal of Power Sources 195 (2010) 3655-3660.

Siegel et al., "Neutron Imaging of Lithium Concentration in FLP Pouch Cell Battery", Journal of the Electrochemical Society, 158 (6), 2011, 8 pages.

Smith et al., "Power and Thermal Characterization of a Lithium-Ion Battery Pack for Hybrid-Electric Vehicles", Journal of Power Sources 160, 2006, pp. 662-673.

Tang et al., "Measurement of Chloride-Ion Concentration with Long-Period Grating Technology", Smart Mater. Struct. vol. 16, 2007, pp. 665-672.

Triollet et al. "Discriminated measures of strain and temperature in metallic specimen with embedded superimposed long and short fibre Bragg gratings", Meas. Sci. Technol., vol. 22, No. 1, Jan. 2011, pp. 015202.

Udd et al., "Fiber Optic Distributed Sensing Systems for harsh Aerospace Environments", 12 pages.

Van Steenkiste et al., "Strain and Temperature Measurement with Fiber Optic Sensors", 1997, 9 pages.

Wang et al., "Aging Effects to Solid Electrolyte Interface (SEI) Membrane Formation and the Performance Analysis of Lithium Ion Batteries", Int. J. Electrochem, Sci., 6, 2011, pp. 1014-1026.

Wang et al. "Simultaneous measurement of strain and temperature using dual-period fiber grating", Proc. SP!E, vol. 4579, 2001, pp. 265-268.

Wang et al. "Understanding Volume Change in Lithium-Ion Cells during Charging and Discharging Using In Situ Measurements", Journal of the Electrochemical Society, 154 (1), 2007.

Xu et al. "Discrimination between strain and temperature effects using dual-wavelength fibre grating sensors", Electron. Lett., vol. 30, No. 13, pp. 1085-1087, 1994.

Zhao et al. "Discrimination methods and demodulation techniques for fiber Bragg grating sensors", Opt. Lasers Eng., vol. 41, No. 1, pp. 1-18, Jan. 2004.

Zhou et al. "Simultaneous measurement for strain and temperature using fiber Bragg gratings and multimode fibers", Appl. Opt., vol. 47, No. 10, Apr. 2008, pp. 1668-1672.

File History for U.S. Appl. No. 13/630,660.
File History for U.S. Appl. No. 14/257,673.
File History for U.S. Appl. No. 14/339,050.
File History for U.S. Appl. No. 14/331,318.

\* cited by examiner

BATTERY WITH EMBEDDED FIBER OPTIC CABLE

STATEMENT REGARDING FEDERALLY SPONSORED RESEARCH AND DEVELOPMENT

This invention was made with government support under contract DE-AR0000274 awarded by ARPA-E (Advanced Research Projects Agency-Energy). The government has certain rights in the invention.

TECHNICAL FIELD

This application relates generally to battery cells with embedded fiber optic cables. The application also relates to components, devices, and systems, and methods pertaining to such battery cells.

BACKGROUND

Battery management systems that rely on external cell performance parameters, such as voltage, current, and temperature, to determine state-of-charge (SOC) and/or state-of-health (SOH) result in conservative overdesign to manage the uncertainty in battery SOC and/or battery degradation with aging. This reliance on conservative overdesign of batteries has affected the widespread adoption of clean technologies, such as electric vehicles and power grid storage, by providing less accurate estimations regarding SOC and SOH. Conservative overdesign of batteries arises in part because the battery state cannot be fully understood from external parameters alone.

Some external methods for determining the SOC and SOH of battery cells include electrochemical impedance spectroscopy (EIS), neutron radiography and optical microscopy. These methods have been ineffective for mass production and distribution due to the inability to work properly during non-equilibrium states for EIS and the need for additional bulky and expensive equipment for neutron radiography and optical microscopy. Another method involves embedding MEMS temperature sensors in lithium-ion cells; however, these methods suffer from electromagnetic interference noise issues and the need for dedicated analog wires in each cell.

SUMMARY

Some embodiments are directed to a method of fabricating an electrochemical energy storage cell. A portion of a fiber optic cable including at least one fiber optic sensor is positioned over a current collector layer of the electrochemical energy storage cell. The electrode material of the electrochemical cell is deposited over the fiber optic cable. according to various aspects, the electrochemical energy storage cell may be or comprise a battery or supercapacitor.

Some embodiments involve an electrochemical energy storage cell having a cell stack. The cell stack includes a first current collector layer and a first electrode material disposed as a first electrode layer over the first current collector layer. A fiber optic cable including at least one optical sensor is embedded in the first electrode layer. The cell stack includes a second current collector layer. A second electrode material is disposed as a second electrode layer over the second current collector layer. A separator layer is arranged between the first and second electrode layers.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein involve approaches for embedding fiber optic cables and optical sensors into an electrochemical energy storage cell, such as a battery or supercapacitor. Such fiber optic cables and sensors provide in situ, real-time parameter monitoring of the electrochemical cell. Optical sensing can be used to detect various internal parameters of the electrochemical cell such as internal temperature, stress, strain, acoustic emission, ion concentration, chemistry, presence and/or concentration of gas, and/or other internal parameters. Electrochemical cells with fiber optic cables embedded in the electrode material are disclosed along with methods of making such cells.

Figure 1A:
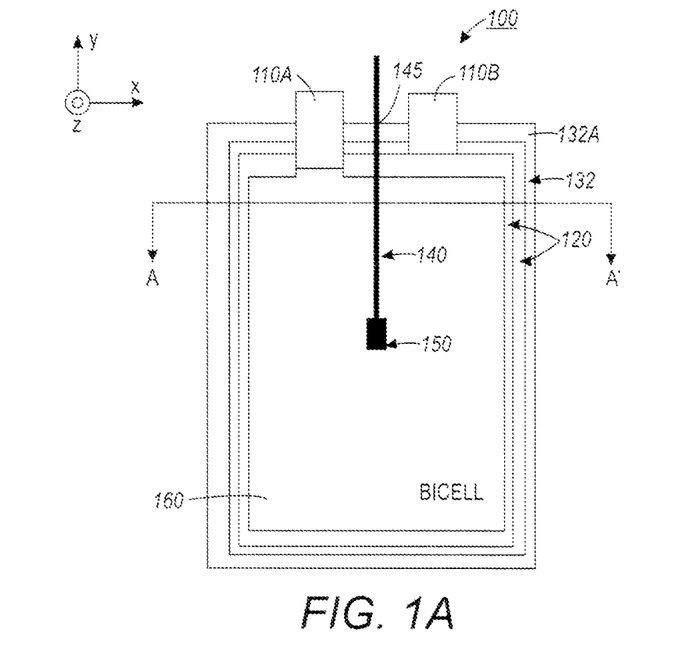
FIGS. 1A-1B show a fiber optic (FO) cable that includes one or more optical sensors embedded into the electrode material of an electrochemical energy storage cell in accordance with approaches discussed herein.
Figure 1B:
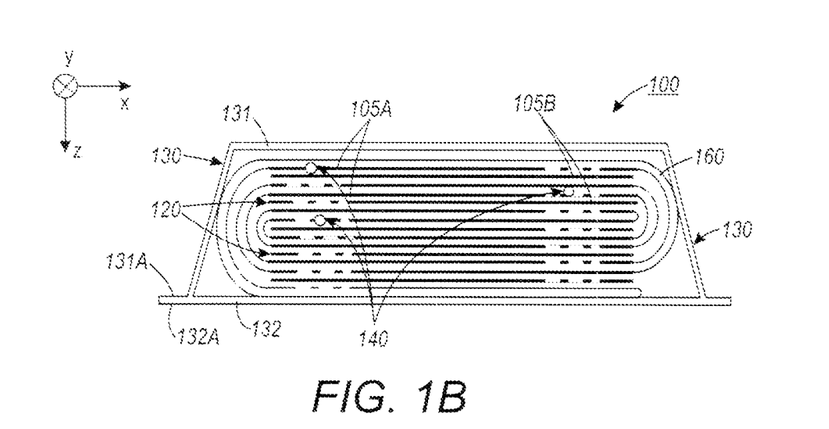

FIGS. 1A-1B illustrates fiber optic (FO) cables 140 that include one or more optical sensors 150 embedded within electrodes 105a, 105b of an electrochemical cell 100. FIG. 1A shows a side cutaway view of the inside of the electrochemical cell 100. FIG. 1B shows a lateral cross sectional view of the electrochemical cell taken through line A-A'. The sensor(s) 150 disposed on the FO cable 140 may comprise any type (or multiple types) of optical sensor, including fiber Bragg grating (FBG) sensors and/or etalon or Fabry-Perot (FP) sensors. The sensor(s) may be disposed on a tip or anywhere along a length of the fiber optic cable internal to the cell casing.

Input light from a light source (not shown in FIGS. 1A-1B) travels through the fiber optic cable 140 to the sensor(s) 150 where the input light interacts with the sensor(s) 150. A sensor 150 may reflect or absorb a portion of the input light and emanates output light that changes in response to changes in a sensed parameter.

Fiber Bragg grating (FBG) optical sensors can be formed, for example, by a periodic modulation of the refractive index along a finite length (typically a few mm) of the core of the FO cable. This pattern reflects a wavelength, called the Bragg wavelength that is determined by the periodicity of the refractive index profile of the sensor. In practice, the sensor typically reflects a narrow band of wavelengths centered at the Bragg wavelength. The Bragg wavelength at a characteristic or base value of the external stimulus is denoted $\lambda$ and light having wavelength $\lambda$ (and a narrow band of wavelengths near $\lambda$) are reflected when the sensor in the base condition. When the sensor is subjected to an external stimulus, such as temperature, strain, or other such stimulus, the stimulus changes the periodicity of the grating and the index of refraction of the FBG, and thereby alters the reflected wavelength to a wavelength, $\lambda s$, different from the base wavelength, $\lambda$. The resulting wavelength shift, $\Delta\lambda/\lambda = (\lambda-\lambda s)/\lambda$ is a measure of the stimulus.

Optical sensing as discussed herein allows for incorporating multiple sensing elements on a single fiber optic cable. Through multiplexing, it is possible for one fiber optic cable to carry the output light of multiple sensors. The sensors can be individually interrogated through time domain and/or wavelength domain multiplexing/demultiplexing.

The electrochemical cell 100 may be a supercapacitor, such as an electric double layer capacitor or pseudo-capacitor, or it may be a battery cell of lithium ion, nickel metal hydride, nickel cadmium, or other chemistry having cylindrical, button, prismatic, pouch or other cell configuration. The electrochemical cell 100 typically includes a cell casing 130 that surrounds and encloses the electrochemical layers within the casing 130. In the illustrated embodiment, the electrochemical cell 100 includes an anode 105a, a cathode 105b, and separator layer 120. The anode and cathode 105a, 105b have external connections, anode and cathode connector tabs 110a, 110b, that extend through and protrude from the cell casing 130. A folded cell stack 160 is a folded or rolled stack of cell layers comprising anode layers (anode current collector layer and anode electrode layer), cathode layers (cathode current collector layer and cathode electrode layer) separated by a separator layer 120. Each of the fiber optic cables 140 are embedded within an anode or cathode electrode layer. The fiber optic cables 140 may be disposed on and/or bonded to an anode or cathode current collector layer. Some embodiments include multiple fiber optic cables, wherein some of the fiber optic cables are embedded in the anode electrode material and some of the fiber optic cables are embedded in the cathode electrode material.

FIGS. 1A and 1B illustrate a pouch type cell with a sealed flexible cell casing 130. The cell casing 130 comprises a first cell casing layer 131 having a first sealing edge 131a and a second cell casing layer 132 having a second sealing edge 132a. The first cell casing layer 131 and second cell casing layer 132 are hermetically sealed together at the first and second sealing edges 131a, 132a. As shown in FIGS. 1A and 1B, at least one fiber optic cable 140 enters the cell casing 130, e.g., in a region between the anode and cathode connection tabs 110a, 110b at an entry point 145. The fiber optic cable 140 has an internal portion that is disposed within the cell casing 130 and an external portion that protrudes from the cell casing at the entry point 145. In the illustrated embodiment, the entry point 145 is positioned about halfway between the anode and cathode tabs 110a, 110b, but could be positioned closer to one of the anode or cathode tabs 110a, 110b or elsewhere.

In some embodiments, there may be multiple fiber optic cables embedded within the cell. FIG. 1B depicts a lateral cross-section through line A-A' of a battery cell with multiple fiber optic cables embedded. The fiber optic cables 140 may be positioned in strategic locations to enhance the signal responsive to parameters sensed by the fiber optic sensors 150. In embodiments where multiple FO cables are used, the cables may enter the cell 100 through the same entry point in the cell casing 130. Alternatively, at least some of the multiple fiber optic cables may enter the cell casing 130 through separate entry points.

Figure 2:
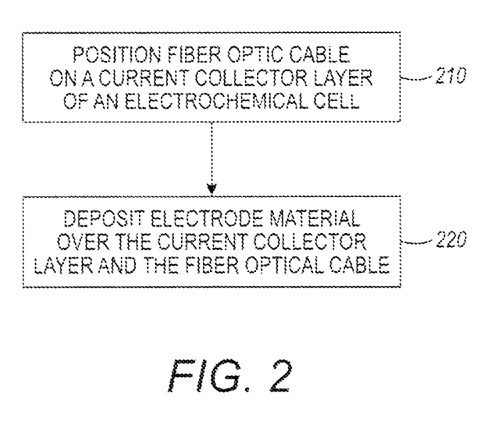
FIG. 2 is a flow diagram of a method of fabricating an electrochemical energy storage cell in accordance with some embodiments.
Figure 3A:
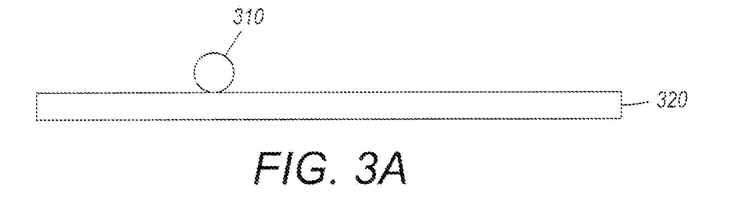
FIGS. 3A through 3C illustrate a fabrication process for electrochemical energy storage cells according to some embodiments.
Figure 3B:
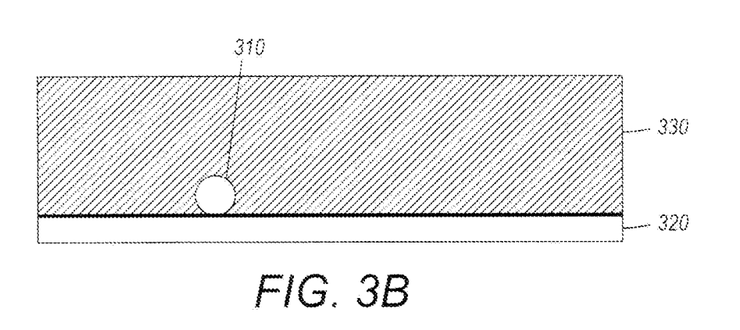
Figure 3C:
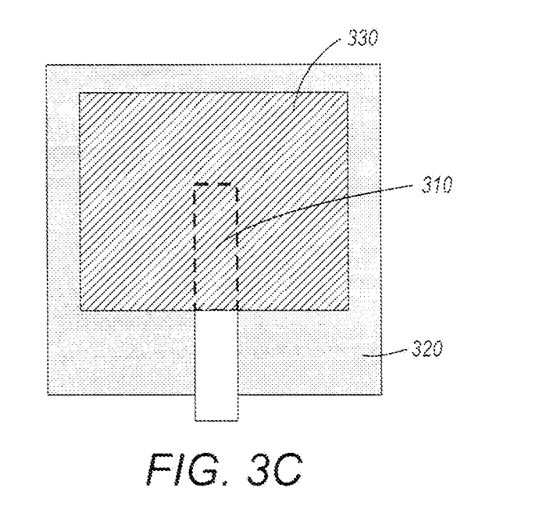

A method of fabricating an electrochemical cell in accordance with some embodiments is described with reference to the flow diagram of FIG. 2 and FIGS. 3A-C. The method of fabricating involves positioning 210 a portion of a fiber optic cable having at least one fiber optic sensor disposed thereon on a current collector layer of an electrochemical cell. The current collector layer may be an anode current collector layer or a cathode electrode layer. FIG. 3A depicts a cross sectional view of a fiber optic cable 310 disposed on the current collector layer 320 of an electrochemical cell. As illustrated in FIGS. 2 and 3B, electrode material 330 is deposited 220 onto the current collector layer 320 and over the fiber optic cable 310. In some implementations, the fiber optic cable 310 may be bonded or otherwise affixed to the current collector layer prior to deposition of the electrode material. For example, the fiber optic cable may be bonded to the current collector layer using a binder material such as the binder used for binding the electrode material. In some implementations, the electrode material 330 is deposited as a slurry and allowed to dry. In some implementations, the electrode material 330 is deposited by jet printing, screen printing, sputtering, aerosol, electrophoretic deposition, and/or any other suitable deposition method. FIG. 3C shows a plan view of the current collector layer 320, fiber optic cable 310 positioned thereon, and electrode material 330 deposited over the fiber optic cable.

Figure 4:
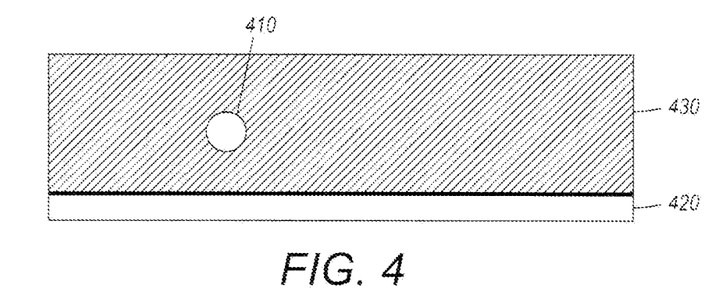
FIG. 4 is a cross sectional view of an electrochemical energy storage cell having a fiber optic cable embedded in the electrode material.
Figure 5:
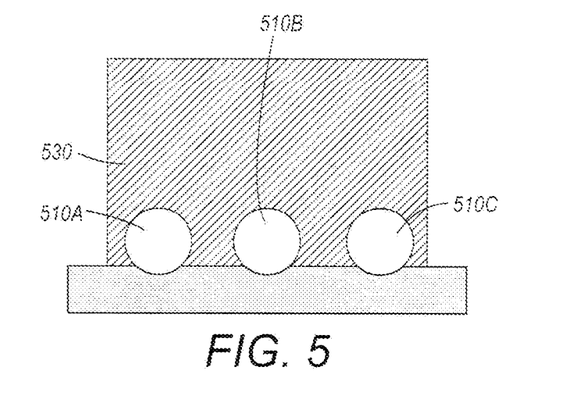
FIG. 5 is a cross sectional view of an electrochemical energy storage cell having multiple fiber optic cables embedded in the electrode material.

FIG. 4 is a cross sectional diagram showing another embodiment, wherein the fiber optic cable 410 is disposed within the electrode material 430 and may not be positioned directly on the current collector layer 420. For example, an initial layer of electrode material (or other material) may be deposited on the current collector layer 420 and the fiber optic cable can be positioned on the initial layer. Electrode material 430 is deposited over the fiber optic cable 410. FIG. 5 is a cross sectional diagram illustrating that, in some implementations, multiple fiber optic cables 510a, 510b, 510c may be embedded in the electrode material 530.

Figure 6:
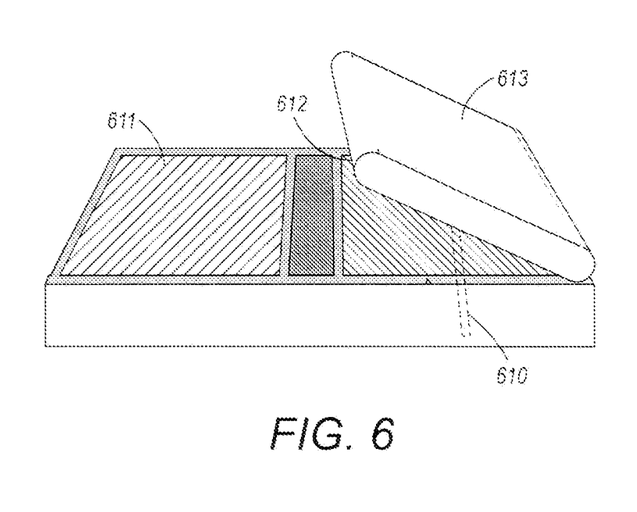
FIG. 6 illustrates a process of folding cell layers into a folded cell stack.

After deposition of the electrode material, the cell layers can be folded, rolled, or otherwise formed into a cell stack. FIG. 6 illustrates an electrochemical cell in the process of being folded into a cell stack. In this example of folding, the cell layers have alternating regions of anode 611 and cathode 612 electrode material with a separator layer 613 that, after the folding, separates the anode and cathode electrodes. In this example, the fiber optic cable 610 is embedded into the cathode electrode layer 612.

Figure 7A:
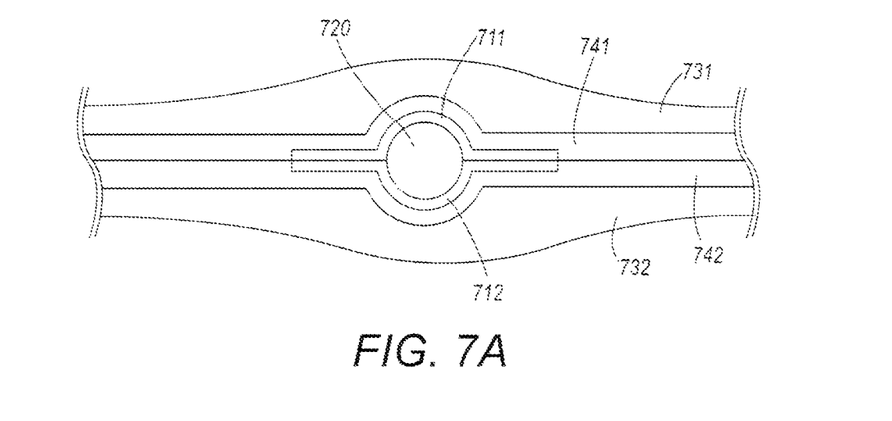
FIG. 7A is a cross section of a portion of the electrochemical energy storage cell at the point of entry of the fiber optic cable into the casing.
Figure 7B:
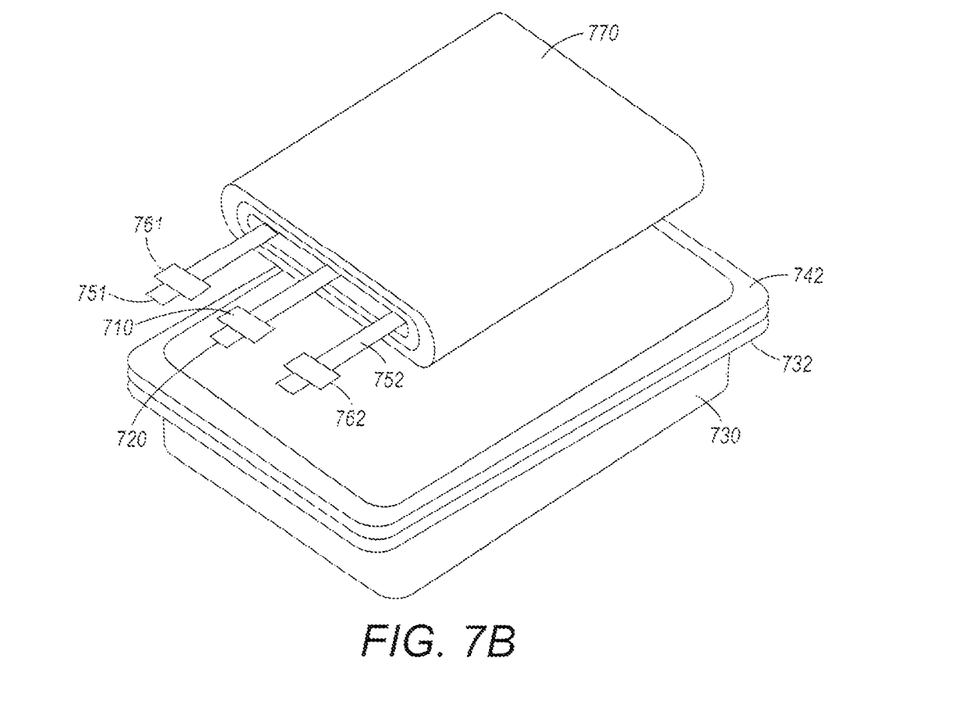
FIG. 7B shows a perspective view of a folded cell stack and a portion of the cell casing.

The cell layers may be encased by a rigid or flexible cell casing. For example, in some implementations the process includes placing the cell layers into a cell casing and sealing the cell layers within the casing. An example of sealing the cell layers in a cell casing is described with reference to FIGS. 7A and 7B. In some implementations, to reduce the likelihood of fluids leaking from the cell casing 730 around the fiber optic cable, a gasket 710 is disposed at least partially around the optical fiber cable 720 near the point of entry before the cell casing is sealed. FIG. 7A shows a cross section of a portion of the electrochemical cell at the point of entry of the fiber optic cable 720. FIG. 7B shows a perspective view of a folded cell stack 770 and a portion of a cell casing 730. The optical fiber gasket 710 comprises a first optical fiber sealing layer 711 disposed partially around the optical fiber cable 720 and a second optical fiber seal layer 712 disposed partially around the optical fiber cable 720. Alternative to separate first and second layers as shown in FIG. 7A, the fiber optic cable gasket 710 may include a single sealing layer that wraps around the fiber optic cable 320. The cell casing 730 includes first and second case sealing edges 731, 732. The cell casing 730 may be sealed using first and second case sealing layers 741, 742 disposed on the case sealing edges 731, 732 (Only one half of the cell casing 730 and only one case sealing layer 742 is shown in FIG. 7B). One or more of the fiber optic cable sealing layers 711, 712, the electrode sealing layers 761, 762, and/or the cell casing sealing layers 741, 742 may be heat activated.

As shown in FIG. 7B, in some configurations, electrodes 751, 752 may be sealed using gaskets comprising sealing layers 761, 762 that reduce or prevent leakage of fluids into or out of the battery case 730. In some implementations, the case sealing layers 741, 742, the electrode sealing layers 761, 762, and/or the fiber optic sealing layers 711, 712 may be or comprise the same material. For example, one or more of the case sealing layers 741, 742, the electrode sealing layers 761, 762, and/or the fiber optic sealing layers 711, 712 may be or comprise a heat seal film. Suitable materials include chemically resistant materials such as a polyolefin-based polymer, a polypropylene or a polyethylene material, e.g., chlorinated polypropylene, ethylene-propylene copolymer, polyethylene-acrylic acid copolymer, and/or polypropylene-acrylic acid copolymer. In some embodiments, one or more of the case sealing layers 741, 742, the electrode sealing layers 761, 762, and/or the fiber optic sealing layers 711, 712 may be or comprise an elastomer and/or an epoxy. Suitable elastomers include X17, for example. Suitable epoxies include EP21ARHT, for example.

In embodiments where the fiber optic cable extends from the battery case near an electrode (or near both electrodes), one or more sealing layers may form the gasket for both the fiber optic and the electrode(s). For example, in some implementations two continuous sealing layers for both the fiber optic cable and the electrodes may be used, with one continuous sealing layer disposed on either side of the fiber optic cable and electrode(s) and extending across both the fiber optic cable and the electrode(s).

In some implementations, the electrode sealing layers, and/or fiber optic cable sealing layers may be sealed, e.g., by thermal fusion, before the cell casing is sealed. In other implementations, after placement of the sealing layers, the fiber optic sealing layers, electrode sealing layers, and cell casing sealing layers are sealed simultaneously, e.g., by thermal fusion.

Figure 8:
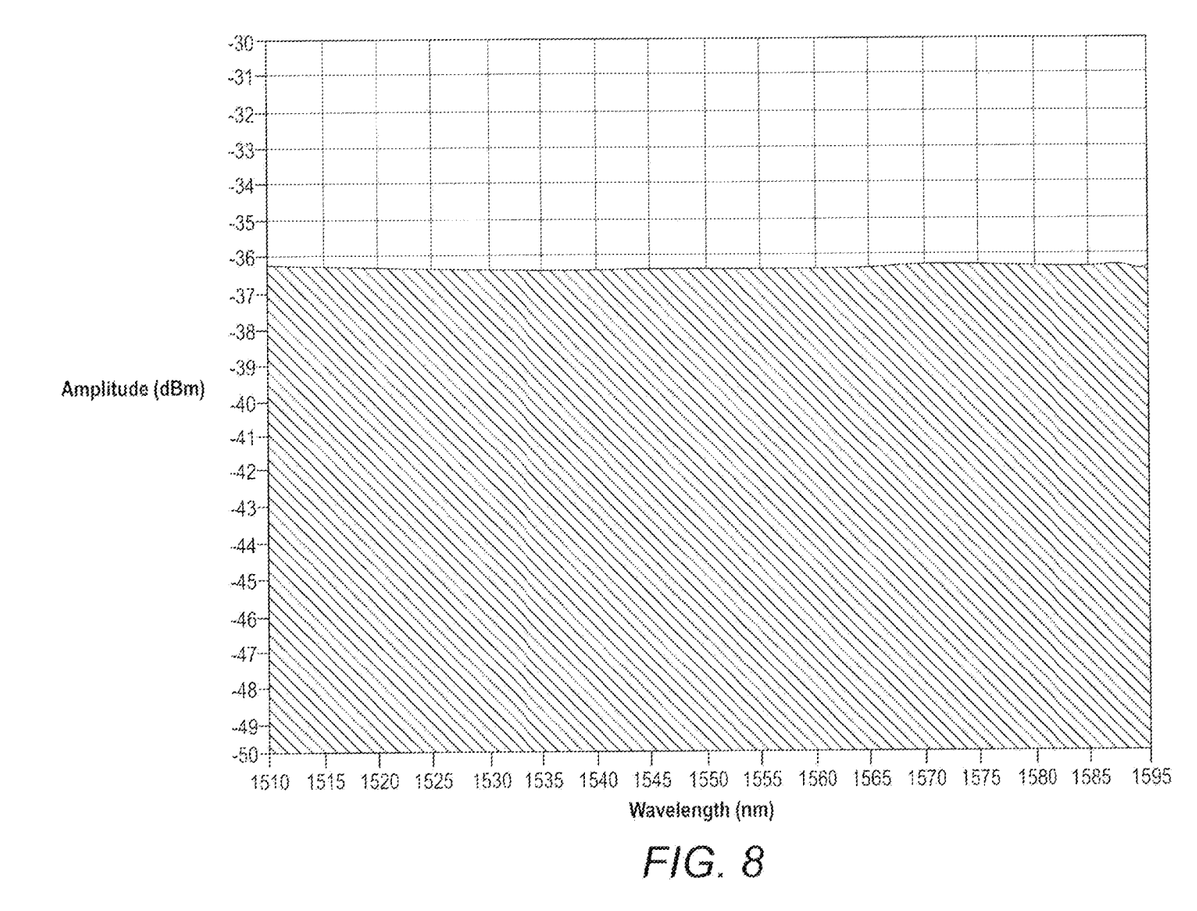
FIG. 8 shows a signal from a fiber optic cable embedded in a cathode electrode.

Prototype cathode electrodes with internally implanted fiber optic cables were fabricated and tested. The reflection spectrum signal from internally implanted fiber optic cables with a cleaved end in the cathode electrode obtained using an optical spectrum analyzer over an infrared wavelength range is shown in FIG. 8 and is comparable to the corresponding reflection flat spectrum signals obtained from other undamaged fiber optic cables having cleaved ends, suggesting that the fiber optic cable is not damaged during the embedding/electrode manufacturing process or the electrode calendaring process. Damaged fiber optic cables tend to have an uneven reflection spectrum signal over the infrared wavelength range.

According to approaches discussed herein, fiber optic cables that include optical sensors are embedded into electrochemical energy storage cells. The sensors may be used to aid management of energy storage systems, e.g., comprising multiple battery cells and/or other electrochemical energy storage devices. As discussed above, optical fiber sensors are internally embedded into cathode and/or anode electrodes during the electrode manufacturing process. Embedding the fiber optic cables and optical sensors into the electrode material enables a more stable method of including optical sensors in the electrochemical device, e.g., as compared with placing fiber optic cables in between the cell layers or along the side of cell layers. This added stability can aid improved analysis of signals from individual cathode or anode electrodes thereby providing the energy storage management system with more accurate information.

The energy storage management system can implement several functions. For example, in a battery implementation, the energy storage management system may monitor cell conditions in terms of parameters such as battery state of charge (SOC), state of power (SOP), and state of health (SOH). Using those parameters, the energy storage management system may control the battery pack charge and discharge cycles, allowing for longer and safer battery operation. When there is no sensor available to measure cell parameters internally, the energy storage management system must rely on monitoring external physical measurements such as voltage, current, and temperature, which is suboptimal. With such external measurement methods, the energy storage management system is limited by the inaccuracies in SOC and SOH resulting in poor detection sensitivity and response and deficiency of separating signals generated from anode and cathode electrodes.

High energy and power Lithium ion (Li-ion) batteries generate heat during rapid charge and discharge cycles. Especially, when charged or over-charged, Li-ion batteries may reach elevated temperatures above 130° C. At this temperature, self-sustaining reactions between the active electrode materials and the nonaqueous electrolyte may keep increasing the cell temperature without further external heating. This condition is referred to as thermal runway and potentially leads to catastrophic failure of the battery. Monitoring internal temperature using external sensors and thermal models is suboptimal, in part because such monitoring involves a time delay, on the order of tens of seconds, between the start of a thermal runaway process inside the cell and the transfer of heat to the surface. This time delay results in a response time that is too slow to prevent catastrophic cell failure.

A typical Li-ion cell consists of active components; cathode ($LiCoO_2$) and anode (graphite) electrodes, and inactive components; the electrolyte, binder, carbon, separator, and positive and negative current collectors. Li-ion transport occurs through the electrolyte from anode (cathode) to cathode (anode) electrodes at the discharge (charge) step. At the cell level, consequently, both active and inactive components are involved during Li-ion intercalation and de-intercalation steps, resulting in complicated interconnected reactions of components in Li-ion battery. At the active material level, large volume expansion (charging) or contraction (discharging step) occurs, e.g., about 300% in Si and Sn and about 10% in graphite, building up the stress into the electrodes and causing performance degradation during cycling. In order to improve the safety and cycle life of batteries, therefore, it is helpful to acquire individual information from the anode or cathode electrode. Such individual information can be acquired using the embedded fiber optical cables and optical sensors discussed herein. In contrast, externally sensed systems provide information based on average values of the whole cell and not the individual anode or cathode electrode.

Embodiments disclosed herein are directed to internal sensing of an electrochemical energy storage device so as to provide the energy storage management system information about the energy storage device. Some embodiments discussed herein involve a method to internally embed fiber optic cables into one or both cathode and anode electrodes. According to some aspects, one or multiple fiber optic cables can be located in the cathode or anode electrode enabling measurement of the condition of different locations between center and edges or other positions of the electrode. As shown in FIG. 8, the signal monitored from an internally implanted fiber optic cable in the cathode electrode is comparable to the data acquired from a bare fiber optic cable suggesting that the cable is not damaged during the embedding/electrode manufacturing process or the electrode calendaring process. Implanted fiber optic cables can avoid stack deformation providing better mechanical integrity, individual signals from the anode or cathode electrode, and simplified manufacturing processes for fiber optic-embedded cells.

Fiber optic cables located in the electrochemical electrode are surrounded by several components such as active material, carbon black, and binders, which can play a protective role for the fiber optic cable during the calendering process and/or during any external impacts during use. Internally embedding the fiber optic cables in the electrode material as described herein provides mechanical integrity for the fiber optic cables. The fabrication approaches may be applied to different types of electrochemical energy storage devices including battery cells having many different physical configurations: e.g., cylindrical, button, prismatic, and pouch type cells. Compared to external measurement approaches, embedded fiber optic cables provide better sensitivity and faster signal response, and convey more accurate cell-state information to the energy storage management system.

Inserting fiber optic cables can cause battery leaks near the fiber optic cable entry point located in the cell, leading to early failure and safety issues. According to some implementations, heat sealing agents are applied to the fiber optic cable in order to prevent or reduce battery leaks that may occur around the fiber optic cable. As discussed above, a sealing agent or film can be applied around the fiber optic cables between the cell casing surfaces. The sealing agent or film can be the same materials or different materials from the sealing agent or film used around the electrode tabs of the cell. The use of sealing films based on highly chemically resistant sealing agents such as suitable epoxies (e.g., EP21ARHT) or elastomers such as X17, not only brings suitable bonding between inserted fiber optic cables and cell sealing surfaces but also protects the fiber optic cable from potential mechanical damage during the cell press-sealing process.

In the beginning of 2013, failures of lithium-ion batteries onboard some aircraft were reported. Despite intensive investigations by the United State Federal Aviation Administration (FAA), to identify where the accidents were initiated, it was challenging to identify the root failure cause or establish early predictors of possible similar incidents in the future. Using the implanted fiber optic cables discussed herein makes more accurate data accessible, promoting a more complete understanding of battery accidents, and early prediction of incipient battery failure. The configurations discussed herein provide an in-situ characterization measurement tool and the implanted fiber optic cables enable direct evaluation of conditions of individual anode or cathode electrodes. The direct access to individual electrodes can provide quicker information about which electrode is implicated in a failure and where the cell degradation or failures are initiated.

Beyond aircraft applications, such an integral fiber optic sensor built into electrochemical energy storage cells can aid energy storage management systems for a broad variety of domains such as electric vehicles, grid storage, military systems, and satellites.

Electrochemical energy storage cells or often made from many layers of anode and cathode material so that surfaces of the electrodes should be relatively flat in order to reduce or minimize mechanical stresses. In the fabrication approaches discussed herein, stacking misalignment is reduced because the fiber optic cables are internally implanted within the electrode material and thus the fiber optic cables do not add to stacking misalignment.

According to some embodiments, the fabrication process for embedding the fiber optic cables involves depositing, e.g., printing, the anode or cathode material over the fiber optic cable and/or current collector. The cathode or anode slurry material ("inks") may be directly printed/deposited on the fiber optic cable and current collector: this is compatible with current cell manufacturing processes.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method of fabricating an electrochemical energy storage cell, comprising:
   positioning a portion of a fiber optic cable including at least one fiber optic sensor over a current collector layer of the electrochemical energy storage cell, wherein the at least one fiber optic sensor is arranged to sense volume expansion and contraction of an electrode layer; depositing electrode material over the fiber optic cable;
   placing cell layers of the cell within a cell casing having first and second sealing surfaces;
   disposing a first case sealing layer on the first sealing surface;
   disposing a sealing material at least partially around the fiber optic cable and extending in a direction normal to the length of the fiber optic cable;
   positioning the sealing material on the first case sealing layer to position the fiber optic cable to extend outside the cell casing;
   disposing a second case sealing layer on the sealing material; positioning the second sealing surface on the second case sealing layer; and sealing the cell casing, wherein the first and second sealing surfaces have a width and the sealing material is disposed only along a length of the fiber optic cable corresponding to the width.

2. The method of claim 1, wherein positioning the portion of the fiber optic cable over the current collector comprises positioning directly on the current collector layer.

3. The method of claim 1, further comprising folding or rolling the cell layers before placing the cell layers within the cell casing.

4. The method of claim 1, further comprising bonding the fiber optic cable to the current collector layer.

5. The method of claim 4, wherein bonding the fiber optic cable comprises bonding using a binder of the electrode material.

6. The method of claim 1, wherein:
the current collector layer comprises an anode current collector layer; and
depositing the electrode material comprises depositing anode electrode material.

7. The method of claim 1, wherein:
the current collector layer comprises a cathode current collector layer; and
depositing the electrode material comprises depositing cathode electrode material.

8. The method of claim 1, wherein depositing the electrode material comprises:
depositing a slurry; and
allowing the slurry to dry.

9. The method of claim 1, wherein depositing the electrode material comprises printing the electrode material over the fiber optic cable.

10. The method of claim 9, wherein printing the electrode material comprises at least one of j et printing and screen printing.

11. The method of claim 1, wherein sealing the cell casing comprises:
disposing heat activated sealing layers at least over sealing edges of the cell casing; and
sealing the cell casing by thermal fusion of the sealing layers.

12. An electrochemical energy storage cell, comprising:
a cell stack, comprising:
a first current collector layer;
a first electrode material disposed in a layer over the first current collector layer;
a fiber optic cable including at least one optical sensor embedded in the first electrode layer, such that the at least one optical sensor is arranged to sense volume expansion and contraction of the first electrode layer;
a second current collector layer;
a second electrode material disposed in a layer over the second current collector layer;
a separator layer disposed between the first and second electrode layers; and
at least one fiber optic sealing layer disposed at least partially around the fiber optic cable and extending in a direction normal to the length of the fiber optic cable; and
a case comprising:
a cavity into which the cell stack is disposed;
first and second sealing surfaces that define the cavity, wherein the first and second sealing surfaces have a width and the at least one fiber optic sealing layer is disposed only along a length of the fiber optic cable corresponding to the width; and
first and second case sealing layers disposed between the fiber optic sealing layer and the first and second sealing surfaces.

13. The cell of claim 12, wherein the first electrode material comprises an anode material.

14. The cell of claim 12, wherein the cell stack is folded or rolled.

15. The cell of claim 12, wherein the fiber optic sealing layer comprises an elastomeric material disposed at least partially around the fiber optic cable.

16. The cell of claim 12, wherein the fiber optic sealing layer comprises an epoxy disposed at least partially around the fiber optic cable.

17. The cell of claim 12 wherein the at least one optical sensor includes a second optical sensor configured to sense stress, strain, acoustic emission, ion concentration, chemistry, or concentration of a gas.

18. The cell of claim 12, wherein the cell is a battery cell.

19. The cell of claim 18, wherein the battery cell is a cylindrical, button, prismatic, or pouch type battery cell.

20. The cell of claim 12, wherein the cell is a supercapacitor.

21. The cell of claim 12, wherein the fiber optic cable is positioned directly on the first current collector layer.

22. The cell of claim 12, wherein the electrode material is a printed material that is printed over the fiber optic cable.

23. A system that includes multiple cells as in claim 12 coupled to an energy storage management system, the fiber optic cable of each cell of the multiple cells carrying information about the state of charge of the cell to the energy storage management system.

24. The cell of claim 12, wherein the at least one fiber optic sealing layer comprises a first fiber optic sealing layer and a second fiber optic sealing layer.

25. The cell of claim 24, wherein the first fiber optic sealing layer is disposed partially around a portion of the fiber optic cable and a first portion extends in a first direction normal to the length of the fiber optic cable and a second portion extends in a second, opposing direction normal to the length of the fiber optic cable and the second fiber optic sealing layer is disposed partially around the portion of the fiber optic cable and a first portion extends in the first direction normal to the length of the fiber optic cable and a second portion extends in the second, opposing direction normal to the length of the fiber optic cable.

26. The cell of claim 25, wherein the first portion of the first fiber optic sealing layer is disposed on the first portion of the second fiber optic sealing layer and the second portion of the first fiber optic sealing layer is disposed on the second portion of the second fiber optic sealing layer.

27. The cell of claim 12, wherein the at least one fiber optic sealing layer is disposed at least partially around the fiber optic cable and at least partially around at least one electrode.

* * * * *